United States Patent

[11] 3,631,352

[72] Inventors Michael R. Kelley; David A. Le Febre, both of Phoenix, Ariz.

[21] Appl. No. 101,890
[22] Filed Dec. 28, 1970
[45] Patented Dec. 28, 1971

[54] MIDVALUE SIGNAL SELECTOR
8 Claims, 2 Drawing Figs.

[52] U.S. Cl. .......... 328/137, 307/204, 307/211, 307/235, 328/116, 328/127, 328/147, 328/152
[51] Int. Cl. .......... H03k 5/20, H03k 19/42, G06f 11/08
[50] Field of Search .......... 307/204, 211, 219, 235, 265; 328/103, 104, 115, 116, 117, 132, 137, 147, 150, 149, 152, 154

[56] References Cited

UNITED STATES PATENTS

| | | | |
|---|---|---|---|
| 3,243,585 | 3/1966 | Escobosa | 328/152 X |
| 3,278,852 | 10/1966 | Mann | 307/211 X |
| 3,492,588 | 1/1970 | Woodward, Jr. | 328/137 |
| 3,530,385 | 9/1970 | Smith et al. | 307/235 X |
| 3,544,778 | 12/1970 | Masters, Jr. | 307/219 X |
| 3,551,824 | 12/1970 | Rotier | 307/235 X |
| 3,569,731 | 3/1971 | Gavira | 307/211 X |

*Primary Examiner*—Donald D. Forrer
*Assistant Examiner*—L. N. Anagnos
*Attorney*—S. C. Yeaton

ABSTRACT: A midvalue signal selector contains a channel for each of the signals to be compared. Each signal is applied to its respective channel through a comparator which produces a high- or low-level signal depending upon the comparative instantaneous values of the input signal and a feedback signal developed in that channel. Each channel contains a logic voter connected to receive the outputs of all comparators. The logic voter actuates a bipolar weighting switch in accordance with the high or low value of the majority of the signals applied to that logic voter. The output of the weighting switch in each channel is applied to a combination filter and operational amplifier which produces the output and feedback signals for that channel. The hysteresis inherent in a comparator, together with the filter circuit associated with the corresponding operational amplifier, produces an oscillatory signal at the output of the operational amplifier. The comparator receiving the midvalue signal produces a rectangular wave having a duty cycle dependent upon the magnitude of the midvalue signal. The output signal from the corresponding operational amplifier includes a DC component dependent upon the amount that this duty cycle deviates from 50 percent. The comparators of the remaining channels produce steady output signals so that the corresponding logic voters respond only to the midvalue signal.

INVENTORS
MICHAEL R. KELLEY
DAVID A. LE FEBRE
BY Joseph K. Roehl
ATTORNEY

INVENTORS
MICHAEL R. KELLEY
DAVID A. LE FEBRE
BY Joseph M. Roehl
ATTORNEY

MIDVALUE SIGNAL SELECTOR

BACKGROUND OF THE INVENTION

1. Field of the Invention

This invention relates to redundant circuits and more specifically to circuits for selecting a signal having a value intermediate the values of other signals in a plurality of signals.

2. Description of the Prior Art

Redundant circuits are frequently used in systems in which a high degree of reliability is required. Thus a plurality of sensing elements may be used to respond to a single given condition. A separate channel may then be used between each sensing element and the device to be controlled. If one sensing element or a corresponding channel fails, control may still be maintained through a remaining channel.

Since the redundant signals in such a system may differ from each other, however, a problem arises in selecting the signal most likely to be representative of the true value of the variable being monitored. One approach to this problem is to select the signal having a value intermediate the remaining signals on the theory that this "midvalue" signal most nearly represents the desired true value.

Various systems based on this concept are known in the prior art. Diode-transistor, operational amplifiers and binary midvalue selectors, for instance, have been used for this purpose. The diode-transistor and operational amplifier systems, however, depend upon the transmission of analog signals between channels and are therefore subject to errors caused by ground differentials and noise. The binary systems overcome these problems. However, they require complicated clock synchronization between channels. The circuit of the present invention uses pulse width modulation to overcome these difficulties.

SUMMARY OF THE INVENTION

The midvalue of an odd number of analog input signals is determined by providing a separate channel for each input signal, converting each input signal to a pulse train having a duty cycle indicative of the instantaneous comparison of the input and output signals, applying each pulse train to logic voters in each channel, forming a bipolar pulse train in each channel in accordance with the instantaneous binary value of the majority of the signals applied to the logic voter in that channel, and converting the bipolar pulse trains into equivalent analog signals.

DESCRIPTION OF THE PREFERRED EMBODIMENT

Figure 1:
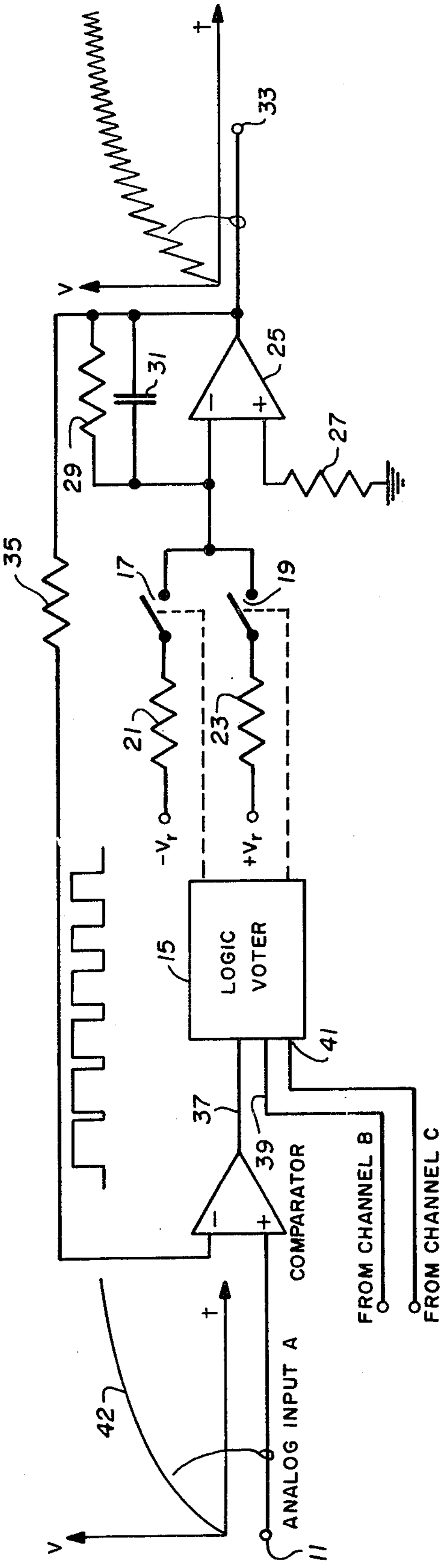
FIG. 1 is a diagram illustrating a single channel of a midvalue selector.

Referring now to FIG. 1, a single channel of a midvalue signal selector includes an input terminal 11 connected to the plus input terminal of a signal comparator 13. A feedback loop is connected to the minus input terminal of the comparator. The signal comparator is a conventional device which provides a high output voltage when the signal applied to the plus input terminal of the comparator is positive with respect to the signal applied to the minus input terminal and a low output voltage when the signal applied to the plus terminal is negative with respect to the signal applied to the minus input terminal. The output of the comparator is conveniently referred to ground potential and the output signal may be considered as traversing between a logic ONE and a logic ZERO. Such comparators are well known in the art. A description of such comparators, for instance, is given on page 220 of Korn & Korn, "Electronic Analog and Hybrid Computers," published by McGraw-Hill in 1964.

The output of the comparator 13 is applied to a logic voter 15. Logic voters, or "majority gates," are conventional devices which respond to the number of high and low voltages applied to their input and generate an output that represents the majority vote of the input signals. Suitable logic voters are described in an article entitled, "How to Achieve Majority and Threshold Logic with Semiconductors," appearing in Electronics Magazine, Vol. 36, No. 48, pages 23–25. Essentially, such a logic voter may include a resistance-summing network feeding a threshold transistor. The summing network and transistor are proportioned so that a low voltage applied to a majority of the terminals will provide a low output voltage, whereas a high input voltage applied to a majority of the input terminals will provide a high output voltage.

The logic voter produces a switching signal that actuates first and second weighting switches 17 and 19 alternatively so that switch 17, for instance, is closed and switch 19 is opened whenever the majority of the comparators produce a high-level signal. Whenever the majority of the comparators produce a low-level signal, the positions of the switches 17 and 19 are reversed. The weighting switch 17 may conveniently be driven directly from the threshold transistor in the logic voter and the weighting switch 19 may be driven through an inverting stage from the same threshold transistor.

The weighting switches 19 and 17 are connected through weighting resistors 23 and 21 to positive and negative reference voltages $V_r$ and $-V_r$, respectively.

The switches 17 and 19 are connected to the minus input terminal of an operational amplifier 25. The plus input of the operational amplifier 25 is connected through a resistor 27 to ground. A capacitive network including a filter resistor 29 and a filter capacitor 31 is connected around the amplifier 25. The output voltage from the amplifier 25 appears at a terminal 33.

The output voltage from the amplifier 25 is also fed back to the minus input terminal of the comparator 13 through a resistor 35 which cooperates to attenuate the feedback voltage to a suitable level.

The logic voter 15 receives a signal from the comparator 13 at an input terminal 37. A similar signal is received from a second channel "B" through an input terminal 39. A third input signal is received from a third channel "C" through an input terminal 41.

The logic voter 15 is adjusted so that if a binary ONE signal is applied to two or more of the input terminals, the switch 17 will be closed.

The operational amplifier 25 and the filtering circuit function as a wave-forming network that provides an increasing voltage during the time that the switch 17 is closed, and a decreasing voltage during the time that the switch 19 is closed. Because of the time delay in the filtering circuit and the hysteresis inherent in the comparator 13, steady voltages applied to the various input terminals will cause a triangular oscillatory voltage to appear at the output of the amplifier 25. The components in the capacitive network are selected to provide an oscillatory voltage having a rate of change that is high with respect to the rate of change expected in the input signals.

Assume, for purposes of illustration, that the signal from channel B remains at a level of binary ONE and the signal from channel C remains at a level of binary ZERO. The signal applied to the logic voter from the comparator 13 then determines the majority vote. Effectively, these are the conditions that obtain when the signal applied to the input terminal 11 is the midvalue signal.

Assume further that a zero voltage is applied to the terminal 11, that there initially is no output voltage from the amplifier 25, and that weighting switch 17 is closed. A voltage will gradually build up at the output terminal of the amplifier 25 and a corresponding feedback signal will appear at the minus input terminal of the comparator 13. Because of the hysteresis in the comparator 13, the feedback signal will overshoot the voltage necessary to switch the comparator before a corresponding signal appears at the input terminal 37 of the logic voter 15. When the logic voter finally is switched by such signal, the feedback signal at the negative terminal of the comparator 13 will exceed the switching threshold. When the logic voter finally switches, however, the output voltage of the amplifier 25 will decrease. Again, because of the hysteresis in the comparator and the time delay in the filtering network, this decreasing voltage will also overshoot the threshold of the comparator 13. In this way, the circuit will oscillate in response to steady voltages applied to the input terminals of the device. This oscillatory voltage will appear as a rectangular wave train at the output of the comparator. The frequency of the oscillatory voltage is determined by the circuit constants. Under the assumed condition of a zero input voltage at the terminal 11, the duty cycle of the wave train at the output of the comparator 13 will be 50 percent.

In general, the rectangular wave train produced by the comparator will have a duty cycle of 50 percent when the DC component of the feedback voltage is equal to the analog input signal.

Assume now, that the input voltage is gradually increased to a positive plateau as indicated by curve 42 of FIG. 1. This will cause a logic ONE to appear at the output of the comparator 13 so as to permit the logic voter 15 to close the switch 17. Since the feedback voltage must now build up to a level that exceeds the instantaneous level of the voltage applied to the terminal 11, a larger portion of the oscillatory cycle will be required for this purpose. Thus the time that the comparator 13 is in the binary ONE state will be a proportionately larger portion of the oscillatory cycle than was the case when a zero voltage was applied to the input terminal 11.

The duty cycle of the wave train from the comparator 13 will thus be increased on response to a positive input signal. As the output voltage from the amplifier 25 approaches the level of the input signal, the duty cycle will gradually return to the 50 percent level.

If a negative voltage were applied to the input terminal 11, the duty cycle would be correspondingly decreased. As the output voltage approached this negative level, however, the duty cycle of the wave train from the comparator 13 would again gradually approach 50 percent.

Figure 2:
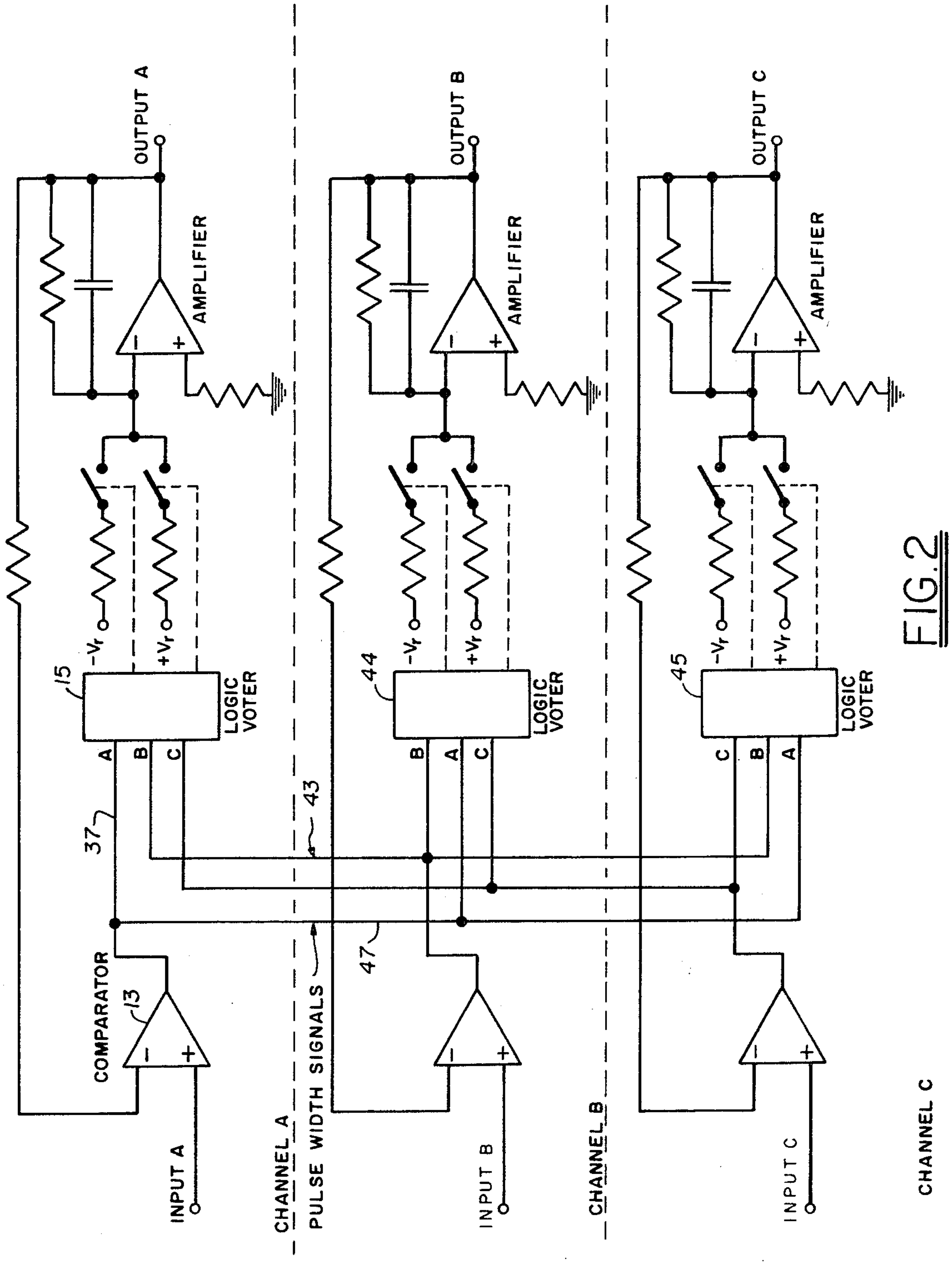
FIG. 2 is a diagram illustrating a three-channel midvalue signal selector constructed in accordance with the principles of the invention.

FIG. 2 represents a three-channel midvalue signal selector. The three channels are identical. The output signal from any comparator is applied to the logic voters in each of the channels. Thus, for instance, the output signal of the comparator 13 in channel A is applied to the logic voter 15 through a lead 37 and is also applied to the logic voter 43 in channel B and the logic voter 45 in the channel C through the line 47.

The three-channel signal selector will ordinarily receive signals having three different magnitudes. Thus, for instance, the signal applied to the input terminal A will be the highest voltage received, the signal applied to the input terminal C may have the lowest magnitude of the signals received and the signal applied to the input terminal B may be intermediate these other two signals. Under these conditions, the comparator 13 in channel A will provide a steady binary ONE output and the comparator in the channel C will provide a steady binary ZERO output. The input terminals A and C on each of the logic voters will then be held at logic ONE and logic ZERO levels respectively. Because of this, each of the logic voters will respond to the binary value of the signal applied to the input terminal B from the comparator in channel B since this signal forms the majority vote for each of the logic voters. The output signal at the output terminal of channel B will be formed in the same fashion as that explained previously with respect to FIG. 1. The remaining channels, A and C, will operate in an open loop fashion since the comparators in these circuits remain stable under the assumed conditions. Thus a voltage equivalent to that appearing at the output of channel B will also be formed at the outputs of channels A and C.

Operation will continue in this fashion as long as the amplitude of the signal applied to input terminal B remains intermediate the amplitudes of the signals applied to input terminals A and C. The DC component of all output signals will follow the level of the signal applied to input B.

Whenever the signal at input terminal B falls above or below one of the other input signals, however, the new midvalue signal will control the logic voters and the output signals from all channels will follow this new midvalue signal.

It will be noticed that the signals applied between channels in the lines 43 are pulse width modulated signals. Variations in the magnitude of these signals caused by interference, improper grounding or noise will have no effect on the accuracy of operation. Similarly, there is no need for elaborate synchronization between channels. Thus the circuit offers a reliable, yet uncomplicated, means for selecting the midvalue signal.

It will be appreciated that although a three-channel selector has been chosen for purposes of illustration, the principles of the invention may be applied to any odd number of input signals. The logic voters in such cases may be expanded to accommodate such signals by obvious means.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A midvalue signal selector for use with a plurality of analog input signals comprising an individual channel for each signal in said plurality, each of said channels including:

input and output means, a signal comparator coupled to receive analog input signals through said input means, feedback means for coupling a feedback voltage representative of the instantaneous voltage at said output means back to said comparator, said comparator being constructed to provide a voltage of a first level whenever the instantaneous magnitude of the input voltage exceeds that of the feedback voltage and a voltage of a second level whenever the instantaneous magnitude of the feedback voltage exceeds that of the input voltage, means responsive to the voltages from the comparators in each of the channels for producing a rising voltage whenever the majority of the comparators is producing a voltage of said first level and for producing a falling voltage whenever the majority of the comparators is producing a voltage of said second level, said rising and falling voltages having a predetermined rate of change that is high with respect to the rate of change expected in said input signals, and means to apply said rising and falling voltages to said output means.

2. The signal selector of claim 1 wherein said means for producing rising and falling voltages includes means to provide steady DC voltages having polarities dependent upon the level of the majority of the voltages from said comparators and integrating means coupled to receive said DC voltages, whereby said integrating means produces rising and falling voltages having constant rates of change.

3. The signal selector of claim 2 wherein the means responsive to the voltages from the comparators include a logic voter for producing a switching signal indicative of the level of the voltages being produced by a majority of the comparators, and means responsive to said switching signal for producing said DC voltages.

4. The signal selector of claim 3 wherein the means responsive to said switching signal includes positive and negative voltage reference sources and first and second weighting switches responsive to said switching signals for connecting said positive and negative sources, respectively, to said integrating means.

5. The signal selector of claim 4 further characterized in that each of said weighting switches are coupled to their respective reference sources through weighting resistors adjusted to provide DC voltages having equal magnitudes.

6. A midvalue signal selector for use with a plurality of analog input signals comprising an individual channel for each signal in said plurality, each of said channels including:

input and output means, a signal comparator connected to receive a signal through the input means for that channel and a feedback signal from the output means in the same channel, said signal comparator being constructed to produce a high-level signal when the instantaneous magnitude of the input signal exceeds the magnitude of the feedback signal and a low-level signal when the instantaneous magnitude of the feedback signal exceeds the magnitude of the input signal, said comparator being further characterized in that the transition from one to the other of said levels occurs only after a predetermined time delay, logic means coupled to receive signals from the comparators in all channels for producing a DC voltage of one polarity whenever a majority of the comparators produce high-level signals and a DC voltage of the opposite polarity whenever the majority of the comparators in said selector produce low-level signals, wave-forming means for supplying to said output means a gradually increasing signal in response to a DC voltage of one polarity from said logic means and a gradually decreasing signal in response to a DC voltage of the opposite polarity from said logic means, and means for connecting exterior utilization means to said output means.

7. The signal selector of claim 6 in which the logic means includes a logic voter for producing a switching signal indicative of the level of the majority of the signals being produced by the individual comparators, positive and negative reference voltage sources, switching means for alternatively connecting said positive and negative voltage sources to said wave-forming means in response to said switching signals.

8. The signal selector of claim 7 in which the wave-forming means includes an operational amplifier and a capacitive network shunting said amplifier whereby said wave-forming means cooperates to establish oscillations in said channel, said capacitive network being proportioned so that said oscillations occur at a frequency having a rate of change that is high with respect to the rate of change expected in said input signals.

* * * * *